United States Patent [19]
Guinn

[11] Patent Number: 4,993,243
[45] Date of Patent: Feb. 19, 1991

[54] FLESHING TOOL

[76] Inventor: Dale E. Guinn, 410 West Kiowa, Cleveland, Okla. 75020

[21] Appl. No.: 403,901

[22] Filed: Sep. 1, 1989

Related U.S. Application Data

[63] Continuation of Ser. No. 209,183, Jun. 20, 1988, abandoned.

[51] Int. Cl.⁵ ............................................. C14B 19/00
[52] U.S. Cl. ............................................ 69/37; 30/390
[58] Field of Search .......................... 30/306, 307, 390; 69/20, 37, 46

[56] References Cited

U.S. PATENT DOCUMENTS

| | | | |
|---|---|---|---|
| 1,382,126 | 6/1921 | Schroedter et al. | 69/37 |
| 1,631,366 | 6/1927 | Feister | 30/390 X |
| 2,480,994 | 9/1949 | Alberti | 69/46 |
| 2,492,534 | 12/1949 | Porteous | 69/20 |
| 2,518,939 | 8/1950 | Ross | 30/390 X |
| 2,847,845 | 8/1958 | Frank et al. | 69/20 |
| 3,266,535 | 8/1966 | Brodie | 30/390 |

FOREIGN PATENT DOCUMENTS 3113253 10/1982 Fed. Rep. of Germany .......... 69/20

Primary Examiner—Wm. Carter Reynolds
Attorney, Agent, or Firm—Robert E. Massa

[57] ABSTRACT

A portable fleshing tool has a thin, circular blade mounted on a drive shaft of a motor. A front and a rear guard substantially protect the blade, with the rear guard removably attachable to the housing of the motor and the front guard removably attachable to the rear guard. The front guard is slightly vertically adjustable to permit slight adjustment of the depth of a fleshing cut because the fleshing blade is being operated in a plane perpendicular to the plane of the pelt or hide being fleshed.

10 Claims, 3 Drawing Sheets

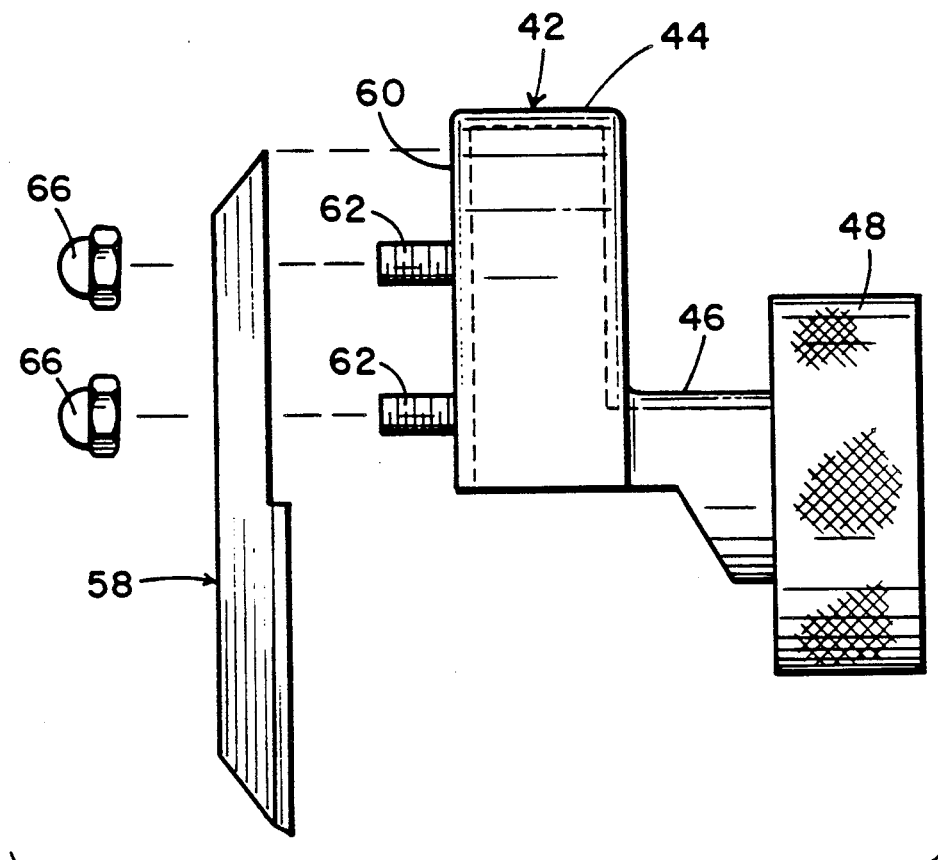
Fig. 2
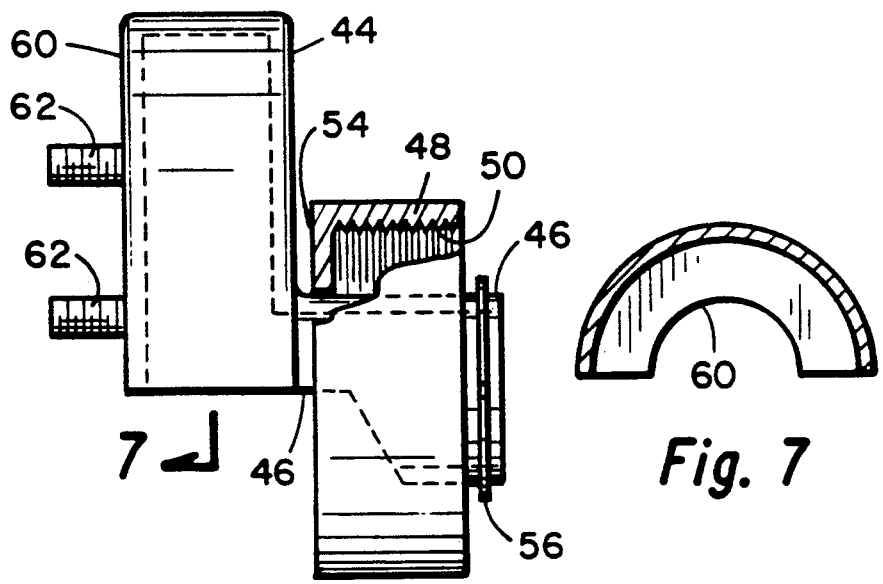
Fig. 3
Fig. 7

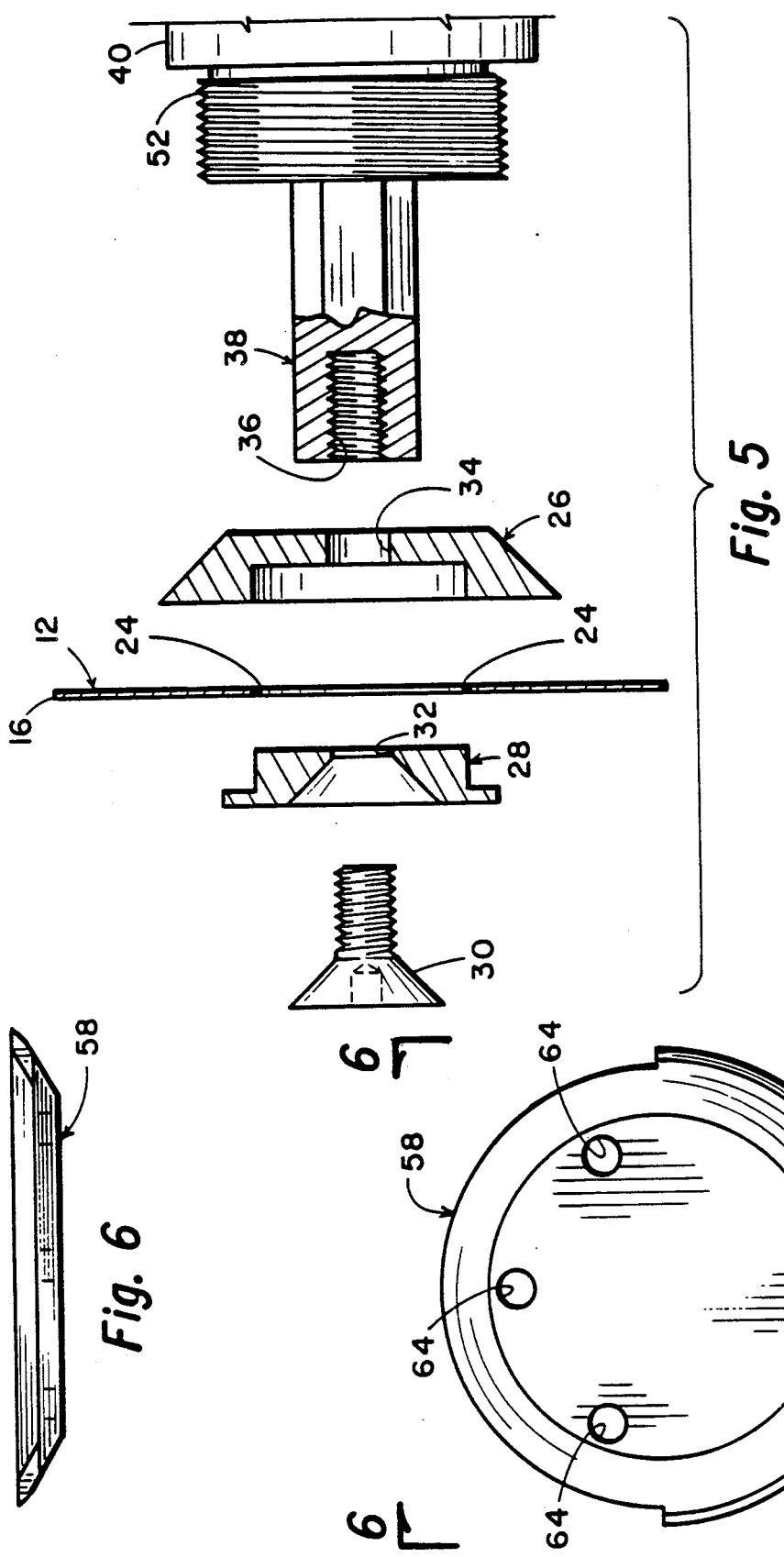

FLESHING TOOL

This is a continuation of co-pending application Ser. No. 0/209,183 filed on Jun. 20, 1988 now abandoned.

FIELD OF THE INVENTION

My invention relates to fleshing tools. More particularly, my invention relates to fleshing tools which are portable and hand-held.

BACKGROUND OF THE INVENTION

A fleshing tool is generally described as an instrument which is used to scrape or shave an animal pelt or hide free of fat, membrane, or other adherent tissue. The instrument or device used as a fleshing tool may be a powerless device such as a knife, or may be a power-driven device or machine.

The treatment of animal furs, hides, and skins to produce useful garments or covers is an ancient art in which the craft of fleshing has always been a necessary step.

Originally, and even today, one of the simple hand tools employed in fleshing is a form of fleshing knife, a blunt concave knife which is scraped across the fleshing surface of a pelt.

Advances with time brought on the development of more elaborate fleshing tools and machines, including large power-driven stationary machines into which large pelts or hides can be fed rapidly. Generally, the large stationary machines comprise a flat table supporting the hide and a cylindrical fleshing component.

Eventually, smaller, portable machines and semi-portable fleshing systems were developed, mostly for accommodating small pelts and hides, providing more complete control of the fleshing operation than could be obtained by use of a large stationary machine.

Several factors influence a choice of employing a small, portable fleshing tool rather than a large, stationary machine.

A small, hand-held fleshing tool permits much more accurate fleshing than could be obtained with a large machine. A small, portable device, such as the one I have invented, is particularly adaptable for fleshing small pelts which require utmost precision because of the many small folded areas within a small pelt. A stationary machine cannot efficiently clean the many small folds of a pelt.

One great disadvantage encountered with a stationary machine, particularly in the use of a stationary machine being used for fleshing large hides, is that the machine will flesh a flat hide to a rather precise thickness without regard for the fact that the hide will have variations in thickness of suitable hide material and unwanted adhering flesh. The treated hide may emerge from the machine having an even thickness, but portions may still include flesh.

When using a portable form of fleshing tool, the operator usually mounts a pelt inside out upon a sturdy, elongated mounting pole or cylinder and applies the portable fleshing tool to the fleshy surfaces by grasping a pair of longitudinally oriented handles in alignment with a cylindrical fleshing component and guides the fleshing component over the pelt. Again, as with the large, stationary fleshing machines, this type of portable fleshing tool operates by the applying of a rotating cylindrical fleshing component against the fleshy interior portion of a pelt. The portable cylindrical device thus involves applying a cylindrical operating component against a cylindrical, or somewhat cylindrical surface, and the large, stationary machine involves applying a cylindrical operating component against a planar surface. It is quite evident that with either type of fleshing tool, there is a limitation on the control of the kind and quality of the resulting surface and product. These two types of devices will result in applying a rather broad cutting area against a broad area of pelt, only except when the user of the fleshing tool will fold the pelt sharply to expose a smaller area of flesh than had been previously exposed.

The prior art discloses the cylindrical types of fleshing devices which I have discussed above, as well as one type of air-powered motor, of which there are many, which could be used in supplying actuating power to my fleshing tool, in addition to conventional electric motors. The prior art I have found includes:

U.S. Pat. No. 2,480,994, Alberti, Sept. 6, 1949
U.S. Pat. No. 2,492,534, Porteous, Dec. 27, 1949
U.S. Pat. No. 2,847,845, Frank et al. Aug. 19, 1958
U.S. Pat. No. 4,154,309, Sappington May 15, 1979
661,164Fr, Massin July 22, 1929

SUMMARY OF THE INVENTION

The primary object of my invention is to provide a fleshing tool which is simple in construction, easy to use, and inexpensive.

Another object of my invention is to provide a fleshing tool which is lightweight, portable, and efficient to use for fleshing various areas of a pelt.

Still another object of my invention is to provide a fleshing tool which may be quickly and easily disassembled for cleaning and which is simple to assemble.

Still another object of my invention is to provide a fleshing tool which is easily adjustable for depth of cut.

Another object of my invention is to provide a power-driven fleshing tool which may be easily held and controlled by one hand.

I have devoted a great deal of time to the art of taxidermy and the craft of fleshing and I am aware of the numerous devices employed in the field of taxidermy and leather treatment.

Initial treatment of a pelt or hide includes an operation described as fleshing, which is the removal of fat or other undesirable tissue from what was previously the interior surface of the pelt or hide. I have described above some of the various fleshing instruments which had been developed.

I have designed a fleshing tool which provides several major advantages over the fleshing tools shown above.

I have designed a fleshing blade for my fleshing tool in the form of a thin, circular blade having fine cutting members around the periphery with the blade mounted on a drive shaft in a plane perpendicular to the axis of the drive shaft.

The fleshing blade is therefore in a plane generally perpendicular to the surface of the pelt or hide being fleshed. With this configuration the position of the blade during use gives a better view of the area being worked than if the fleshing element were an elongated cylinder or if it were a flat blade positioned and being used in a plane parallel to, or generally in line with, the plane of the pelt.

The fine cutting members of the fleshing blade, which I also describe as comprising a serrated edge, provide a fine cutting or shaving edge for the blade.

By placing the fleshing blade directly upon the drive shaft, and thus, perpendicular to the axis of the drive shaft, I have been able to provide a planar front guard closely in front of the fleshing blade in a manner that the front guard will not only act as a protective device but will also provide a means for adjusting the depth of a fleshing cut. Vertical adjustment of the planar guard will expose only a chosen planar area of the fleshing blade and will restrict the depth of the fleshing cut.

My fleshing tool is a portable, hand-held tool, adaptable to incorporate, or be mountable upon, a source of rotative power, such as an electric motor or air-driven motor. The portability of my fleshing tool, in conjunction with the general configuration I have described above, provides several further advantages for my fleshing tool: my fleshing tool is a hand-held tool rather than being a large table model; my fleshing tool can be worked over the pelt rather than the pelt being worked over the tool; and, the small size of the fleshing tool allows more detailed work in tender areas of the pelt or hide; and, of course, the small size permits easier control.

In summary, my fleshing tool comprises a portable, hand-held fleshing tool mountable upon a drive shift of a source of power, such as an electric motor or air motor, or, if preferred, including its own drive shaft which may be connected to a source of power; a thin, circular blade having a plurality of fine cutting members around the periphery thereof mounted on the drive shaft in a plane perpendicular to the axis of the drive shaft; a housing encompassing a source of power; and, a guard mounted on the housing and covering a major portion of the front side of the fleshing blade and adapted to restrict a depth of a fleshing cut of the fleshing blade.

BRIEF DESCRIPTION OF THE DRAWINGS

FIG. 2 is an exploded side elevational view of mounting and guard components of a fleshing tool according to my invention.

FIG. 3 is a side elevational view, partly in section, of a mounting member and rear guard member of a fleshing tool according to my invention showing the cooperation of these components.

FIG. 4 is a front view of a front guard component of a fleshing tool according to my invention.

FIG. 5 is an exploded side elevational view, partly in section, of components of a fleshing tool according to my invention showing partially a mounting component, along with a manner of attachment of a fleshing blade, and with guards removed.

FIG. 6 is a top view of a front guard component of the fleshing tool according to my invention along the lines 6—6 of FIG. 4.

FIG. 7 is a rear elevational view of a portion of a rear guard component of the fleshing tool according to my invention along the lines 7—7 of FIG. 3.

DESCRIPTION OF THE PREFERRED EMBODIMENTS

Figure 1:
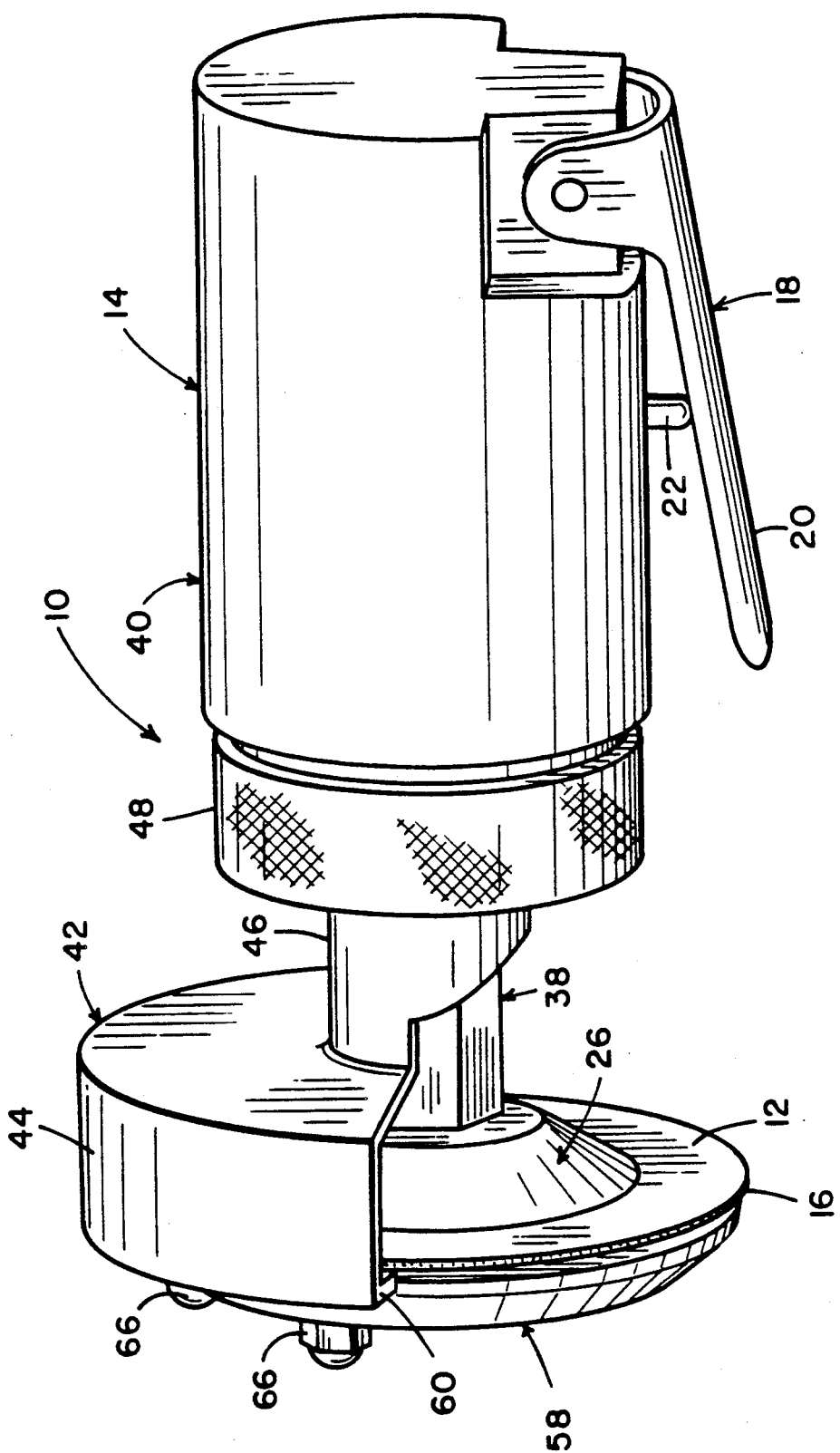
FIG. 1 is a perspective view of a fleshing tool according to my invention showing the fleshing tool mounted upon a schematically-shown source of power.

FIG. 1 is a perspective view of a fleshing tool 10, generally, according to my invention, showing the basic relationship between major operating components, that is, a fleshing blade 12, generally, and a source of power, or motor 14. The fleshing blade 12, generally, is a flat circular blade with fine cutting members 16 around the periphery. As 1 explained above, the motor 14, generally, may be either an electric motor or an air-driven motor, and I am showing it schematically in FIG. 1 without the conventional operating connections of either kind of motor, such as hose connections for an air motor or electric wire connections for an electric motor. With either type of power source, I am showing schematically an activating switch 18, generally, which may be a conventional switch and power or speed control. As, for example, during use the operator will place his hand around the motor 14, generally, and activate switch 18, and consequently the rotative speed of the fleshing tool by squeezing switch lever 10 against a control switch 22.

In FIG. 1 I am showing the fleshing tool 10 in its assembled form, ready for use, and I am describing in the subsequent figures the correlation of the various components, which, as it may be seen, may be easily and quickly assembled or disassembled.

The fleshing blade 12 includes a central wide opening 24 (shown in FIG. 5) so that blade 12 may be mounted securely by being supported on a rear side by a supporting member 26, generally, and on a front side by a front supporting member 28, generally, as shown in FIG. 5. The blade 12 and supporting members 26 and 28 are held securely and removably in place by means of bolt 30 passing through opening 32 of supporting member 28, central opening 24 of blade 12, and opening 34 of supporting member 26, and fitting into threads 36 of drive shaft 38, generally. Drive shaft 38 is shown in FIGS. 1 and 5 as a conventional form of drive shaft, and other suitable forms of securing blade 12 in relation to sturdy support members, as by a chuck, or as shown by the cooperation of support members 26 and 28, may be employed.

I have described above a manner in which a housing 40, generally, encompasses a motor of my fleshing tool 10, generally. I have shown in FIG. 1, and partially in FIG. 5, a manner in which a guard assembly 42, generally, is removably mountable upon one end of housing 40, generally.

I have shown in FIGS. 1, 2, 3, 4, 6, and 7, components of guard assembly 42, generally, and the manner in which the various guard components cooperate.

First of all, I have provided rear guard member 44, comprising a hand guard, which covers a substantial portion of the fleshing blade 12 by being somewhat cylindrical to cover fleshing blade 12 and substantially semi-circular in planar appearance in order to cover a substantial portion of fleshing blade 12. I have provided a portion of guard assembly 42 with a drive shaft guard 46, or rear guard extension. A means for connecting the guard assembly 42, generally, to housing 40 comprises a threaded collar member 48 which includes threads 50 cooperable with threads 52 on housing 40. To mount the guard assembly 42 securely and removably upon the housing 40, threaded collar 48 includes a flange 54 which presses against a split washer 56 easily and removably positioned in a groove (not shown) in drive shaft guard 46 near an end thereof. Split washer 56 is easily removable as desired, acts as a flange, and has a larger outer diameter than the inner diameter of flange 54.

I have described above the manner in which I have incorporated protective means and adjustment means into a portion of my fleshing tool. To do this, I have designed a front guard member 58, referred to in FIG.

1 and also described in FIGS. 2, 4, and 6. I show in FIGS. 2 and 4 the manner and design in which front guard 58, of slightly less diameter than the fleshing blade 12, attaches to guard assembly 42. A front flange portion 60 of rear guard 44 includes bolts 62 secured thereto, and front guard 58 includes enlarged openings 64 through which bolts 62 pass to permit the threading of nuts 66 upon bolts 62 to press front guard 58 against front flange 60. I have provided for the front guard 58 to be vertically adjustable in order to permit a means for somewhat exposing a lower portion of the fleshing blade 12, generally, and therefore adjusting a depth of cut by the fleshing blade 12, generally, by making openings 64 sufficiently larger in diameter than the diameter of bolts 62.

FIG. 7 describes, as shown by the lines 7—7 of FIG. 3, the configuration of the front flange 60 of the rear guard 44.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A portable, hand-held fleshing tool mountable upon a drive shaft of a source of power, comprising:
   a housing encompassing the source of power,
   a thin, circular fleshing blade having a plurality of fine cutting members around the periphery thereof mounted on the drive shaft in a plane perpendicular to the axis of the drive shaft,
   a guard assembly removably mountable on the housing and adjustable to restrict a depth of cut of the fleshing blade,
   the guard assembly comprising:
   a drive shaft guard member including means for connecting the guard assembly to the housing,
   a rear guard member having a cylindrical portion to cover a substantial portion of the fleshing blade, and
   a front guard member of slightly less diameter than the fleshing blade and vertically adjustable for adjusting a depth of cut of the fleshing blade.

2. A portable, hand-held fleshing tool as described in claim 1, wherein:
   the front guard member is adjustable to adjust the depth of cut of the fleshing blade by exposing a lower portion of the fleshing blade.

3. A portable, hand-held fleshing tool as described in claim 1, wherein:
   the front guard member is essentially planar.

4. A portable, hand-held fleshing tool as described in claim 3, wherein:
   the rear guard member is essentially semi-circular in planar appearance.

5. A portable, hand-held fleshing tool as described in claim 4, wherein:
   the rear guard member includes a front flange portion providing means for connecting the front guard member to the rear guard member, the means for connecting the front guard member to the rear guard member includes a plurality of bolts, and
   the front guard member includes a plurality of openings through which the bolts pass in accepting connecting nuts, the openings being enlarged to have a diameter larger than the diameter of the connecting bolts to permit the vertical adjustment of the front guard member.

6. A portable, hand-held fleshing tool as described in claim 5, wherein:
   the drive shaft guard member includes a threaded collar member cooperable with a threaded portion of the housing.

7. A portable, hand-held fleshing tool as described in claim 1, which includes:
   a control switch for the source of power in position on the housing for activation by the hand of the operator holding the tool.

8. A portable, hand-held fleshing tool as described in claim 7, which includes:
   a switch lever on the housing in position for squeezing by the hand of the operator against the control switch.

9. A portable, hand-held fleshing tool as described in claim 6, which includes:
   a control switch for the source of power in position on the housing for activation by the hand of the operator holding the tool.

10. A portable, hand-held fleshing tool as described in claim 9, which includes:
    a switch lever on the housing in position for squeezing by the hand of the operator against the control switch.

* * * * *